T. E. MURRAY.
JOINT FOR SHEATHED CONDUCTORS.
APPLICATION FILED NOV. 20, 1911.
1,028,257.
Patented June 4, 1912.
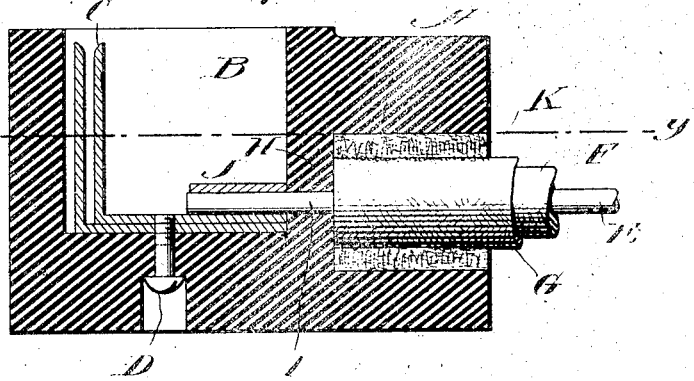
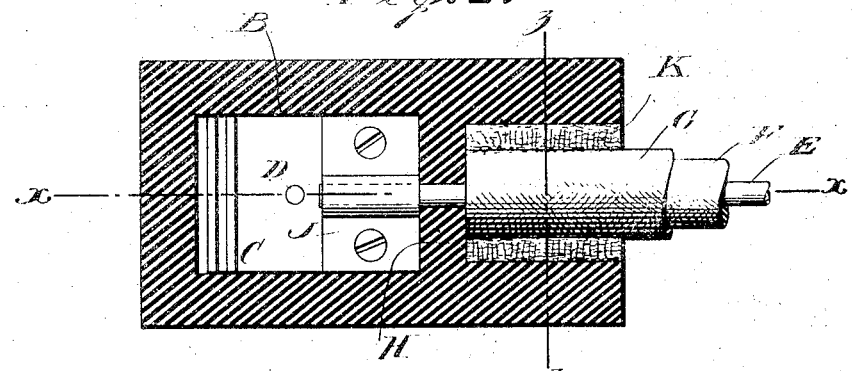
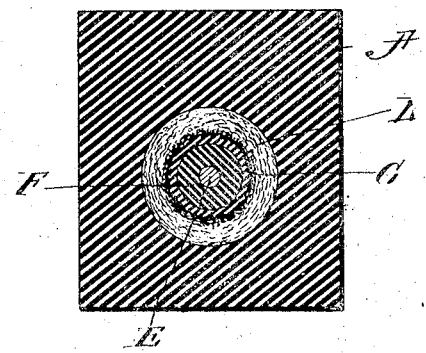

UNITED STATES PATENT OFFICE.

THOMAS E. MURRAY, OF NEW YORK, N. Y.

JOINT FOR SHEATHED CONDUCTORS.

1,028,257.

Specification of Letters Patent.

Patented June 4, 1912.

Original application filed June 29, 1911, Serial No. 636,015. Divided and this application filed November 20, 1911. Serial No. 661,327.

*To all whom it may concern:*

Be it known that I, THOMAS E. MURRAY, a citizen of the United States, residing at New York, in the county of New York and State of New York, have invented a certain new and useful Improvement in Joints for Sheathed Conductors, of which the following is a specification.

The invention relates to joints between metallic bodies, such as pipes, conductor sheathings, and the like, and supports or receptacles therefor, and consists in an enlargement formed upon said body and filling the opening in the support receiving the same, by consolidating within said opening a comminuted mass of the same metal as that forming said body, and causing said consolidated mass to become coherent with the metal of the said body: so that the body and the enlargement thereon become integral, and the enlargement closes the joint between said body and said support. In the present embodiment of my invention, the enlargement is formed by consolidating lead floss upon and around the lead sheathing of an electrical conductor in an opening in a porcelain base block.

In the accompanying drawings—Figure 1 is a cross section of a base block, to which my device is shown applied, said section being taken on the line $x$, $x$, of Fig. 2. Fig. 2 is a horizontal section on the line $y$, $y$ of Fig. 1. Fig. 3 is a vertical section on the line $z$, $z$, of Fig. 2.

Similar letters of reference indicate like parts.

My invention is here shown applied to a base block, or other support, A, preferably of porcelain or other refractory insulating material. In said support is a compartment B, in which is a pair of metallic clips C, secured in place by the screw D, to which clips the circuit conductor E, which forms the core of the lead sheathed cable, is connected. Said cable comprises, as usual, an inner envelop F, of insulating material, and an external lead sheathing G. A cylindrical recess is formed in one wall of the support, and in the partition H, between said recess and the compartment B, is made a hole of sufficient size to permit a denuded end portion I of the conductor E to enter the compartment B and be secured to the clips C by means of an arched plate J. The shoulder formed by the extremity of the sheathing and envelop then abuts against the partition H. In the annular space around the sheathing G lead floss K is gradually tamped and firmly consolidated. During the consolidating operation, the tamping tool should be used to force the lead floss somewhat into as well as against the lead sheathing, so that it coheres to said sheathing. In this way, the metal of the floss and the metal of the sheathing becomes very closely united, and the consolidated floss becomes practically a thicker part of the sheath. In other words, I obtain the same conditions as if the part of the sheath inclosed in the recess were integrally thicker than elsewhere, with this difference, however: that while a previously thickened solid portion of the sheath could not certainly be made to fit the recess with perfect accuracy, the consolidated lead floss enlargement can be so made, because as it is tamped down it adapts itself to every possible inequality in the opening.

Molten lead run into the space between sheathing and base does not meet the conditions of the problem; first, because it requires melting apparatus and immediate use after melting, which is often very inconvenient and practically prohibitory, and second, because the molten lead instantly chilled by contact with cable and base merely forms a casting, which shrinks on cooling and does not perfectly unite with either the sheathing or the support, so that an imperfect joint results.

This application is a division of my application No. 636,015, filed June 29, 1911.

I claim:

1. A support, having an opening and in said opening a body of ductile metal, and, coherent to said body, an enlargement formed by consolidating thereon a comminuted mass of the same metal.

2. A support, having an opening and in said opening a body of lead, and, on said body and cohering thereto, a consolidated mass of lead floss.

In testimony whereof I have affixed my signature in presence of two witnesses.

THOMAS E. MURRAY.

Witnesses:
GERTRUDE T. PORTER,
MAY T. MCGARRY.